United States Patent
Ashida

(10) Patent No.: US 8,902,474 B2
(45) Date of Patent: Dec. 2, 2014

(54) IMAGE PROCESSING APPARATUS, CONTROL METHOD OF THE SAME, AND PROGRAM

(75) Inventor: Jumpei Ashida, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/175,112

(22) Filed: Jul. 1, 2011

(65) Prior Publication Data

US 2012/0050820 A1    Mar. 1, 2012

(30) Foreign Application Priority Data

Aug. 30, 2010    (JP) ................. 2010-192700

(51) Int. Cl.
*H04N 1/40* (2006.01)
*G06T 3/40* (2006.01)
*G06T 1/60* (2006.01)

(52) U.S. Cl.
CPC .......... *H04N 1/40068* (2013.01); *G06T 3/4007* (2013.01); *G06T 1/60* (2013.01)
USPC ........... 358/447; 358/451; 358/529; 358/518; 382/254

(58) Field of Classification Search
USPC .............................................. 358/3, 1.15, 1.9
See application file for complete search history.

(56) References Cited

U.S. PATENT DOCUMENTS

| | | | |
|---|---|---|---|
| 6,373,990 B1 * | 4/2002 | Ushida et al. ................. | 382/252 |
| 6,768,514 B1 * | 7/2004 | Tsuchiya et al. .............. | 348/252 |
| 7,306,306 B2 * | 12/2007 | Katsu et al. ....................... | 347/5 |
| 2006/0082837 A1 | 4/2006 | Hiroe et al. | |
| 2007/0103730 A1 * | 5/2007 | Yasutomi ........................ | 358/3.2 |
| 2009/0033766 A1 * | 2/2009 | Ito ............................... | 348/231.2 |
| 2009/0086294 A1 * | 4/2009 | Sakakibara .................... | 358/514 |
| 2009/0091585 A1 | 4/2009 | Koyanagi | |
| 2009/0202161 A1 * | 8/2009 | Ishikawa et al. .............. | 382/233 |

FOREIGN PATENT DOCUMENTS

| | | |
|---|---|---|
| JP | 3733826 B2 | 1/2006 |
| JP | 2006-121347 A | 5/2006 |
| JP | 2009-037348 A | 2/2009 |
| WO | 2007/102244 A1 | 9/2007 |

OTHER PUBLICATIONS

Gregory A. Baxes, Digital Image processing Principles and Application, 1994, John Wiley and sons; p. 118-122 (Chapter 4).*

* cited by examiner

*Primary Examiner* — Mark Zimmerman
*Assistant Examiner* — Richa Mishra
(74) *Attorney, Agent, or Firm* — Fitzpatrick, Cella, Harper & Scinto

(57) ABSTRACT

An image processing apparatus according to the present invention comprises an input unit sequentially scanning first image data having first resolution, in units of a predetermined number of pixels that are contiguous in a first direction, in a second direction crossing the first direction at right angles, thereby inputting a pixel group corresponding to each unit of pixels, a computation unit calculating pixel values of second image data having second resolution using pixels in a reference area having a predetermined range in the first image data, a storage unit storing pixel values of a range of the first image data that is larger than the reference area in the first direction, and a control unit controlling the computation unit so as to successively output pixels of the second resolution in the first direction in units of the predetermined number of pixels using the stored pixels.

11 Claims, 12 Drawing Sheets

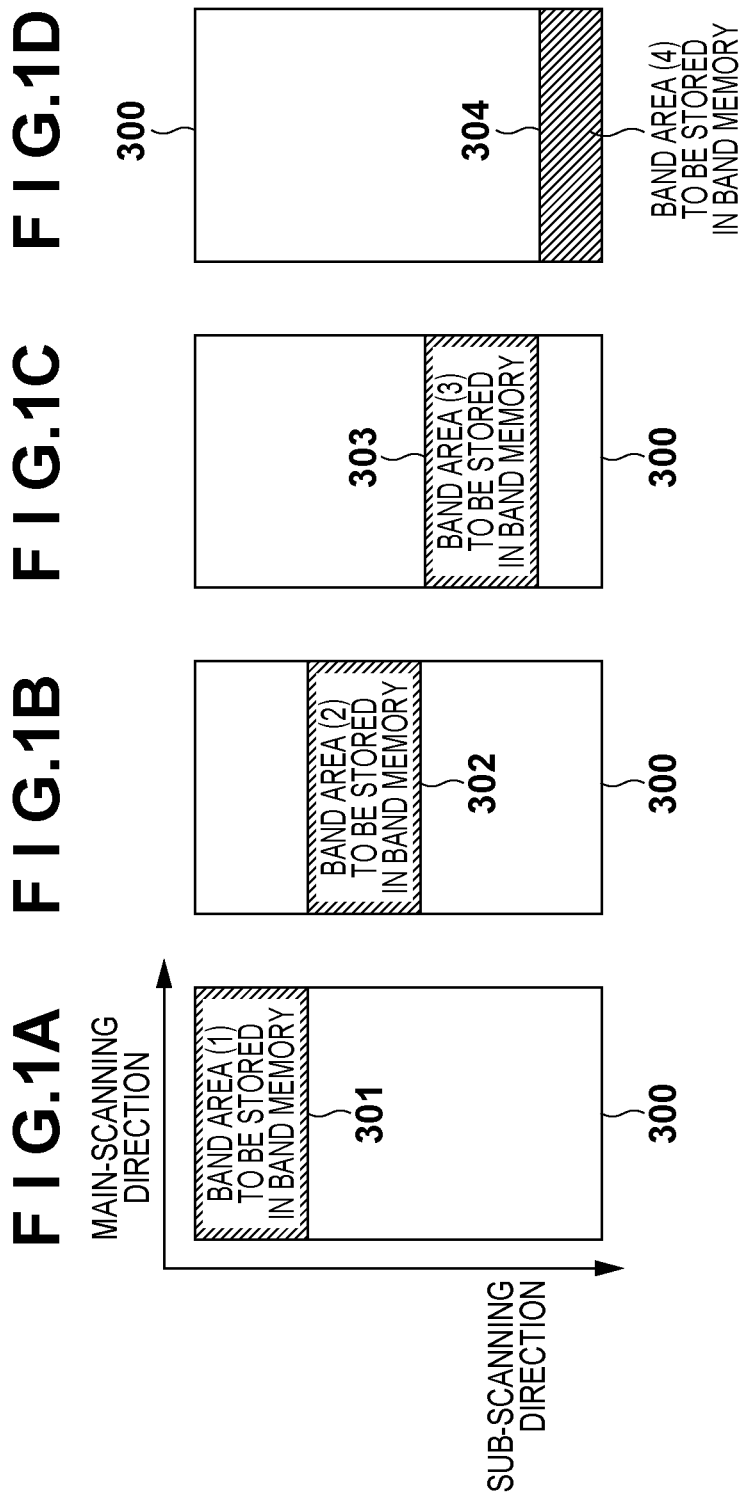

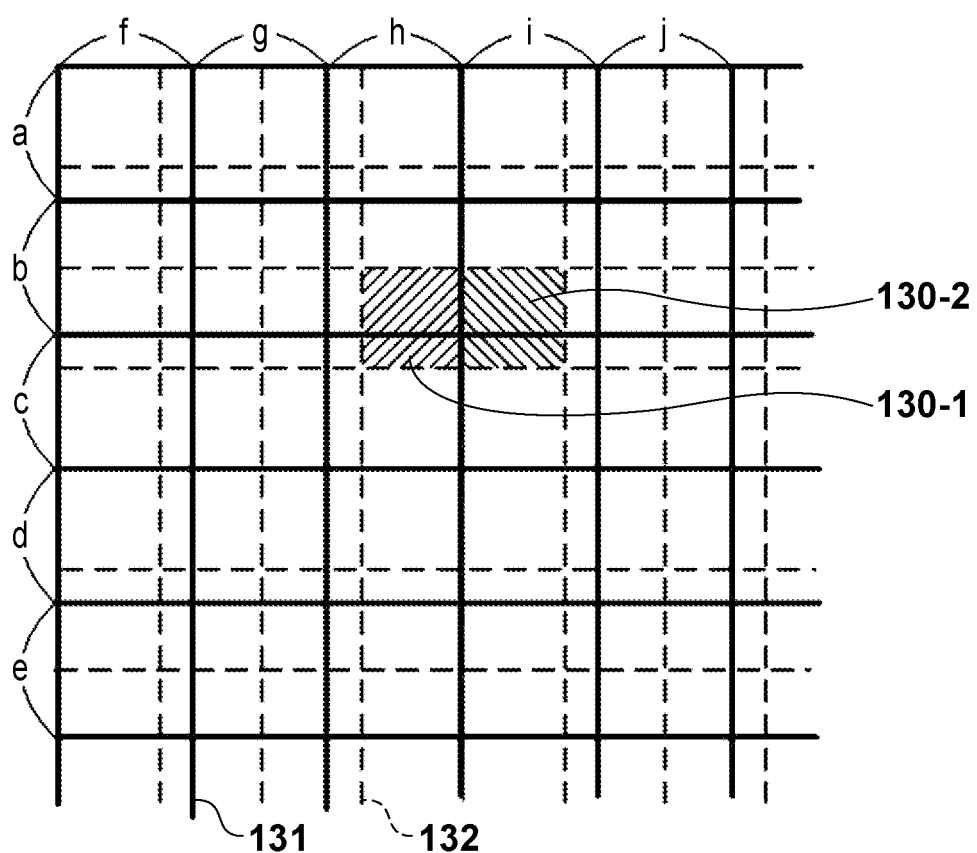
F I G. 2

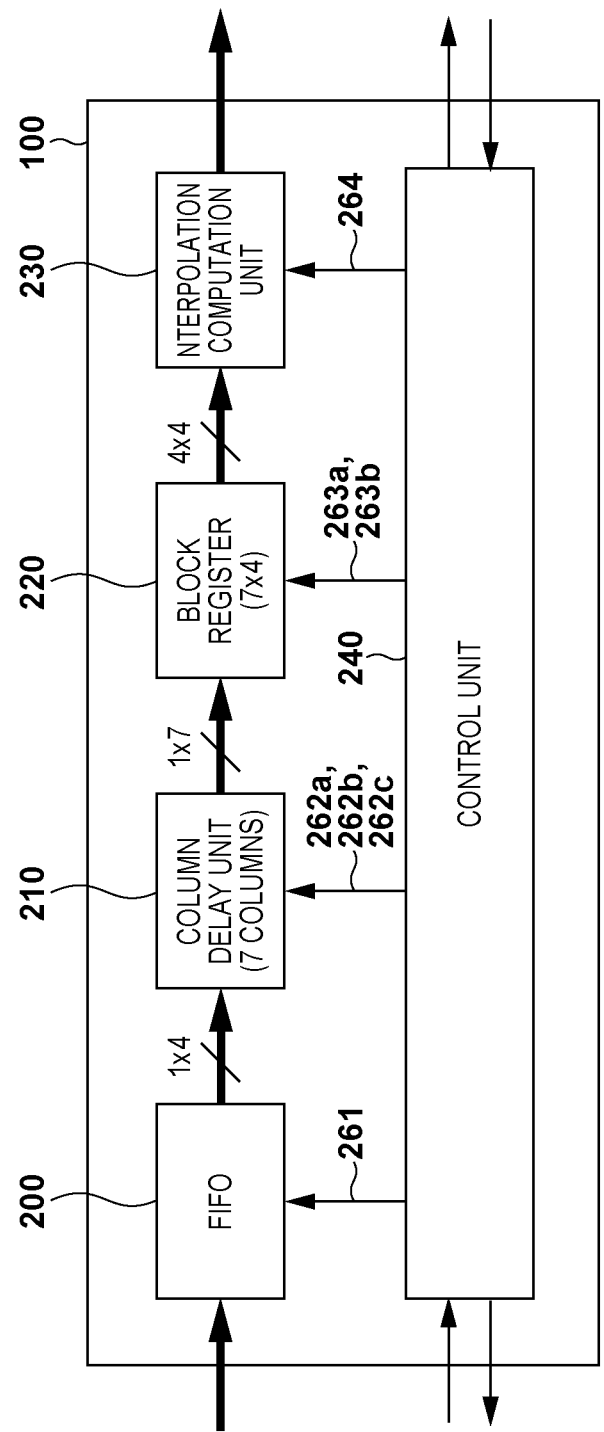

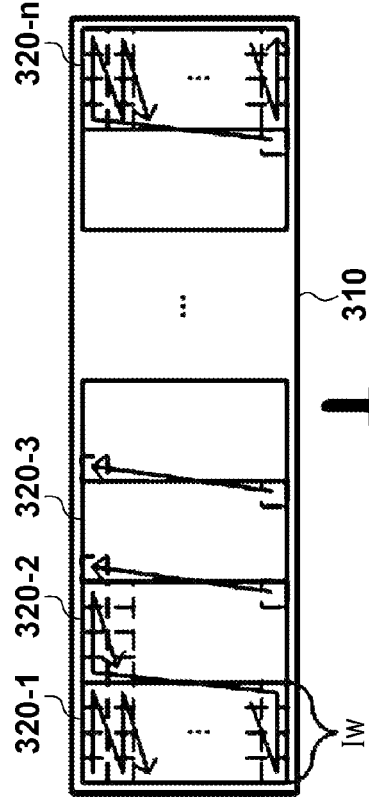
FIG. 4A
FIG. 4B
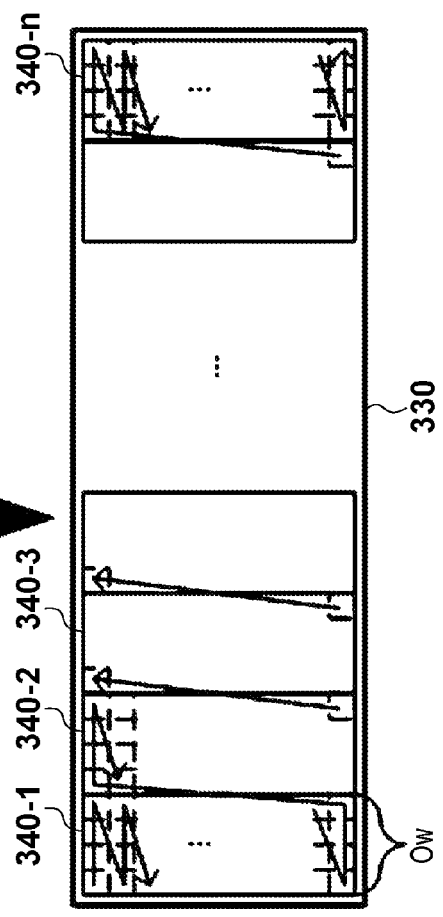
FIG. 4C

F I G. 6
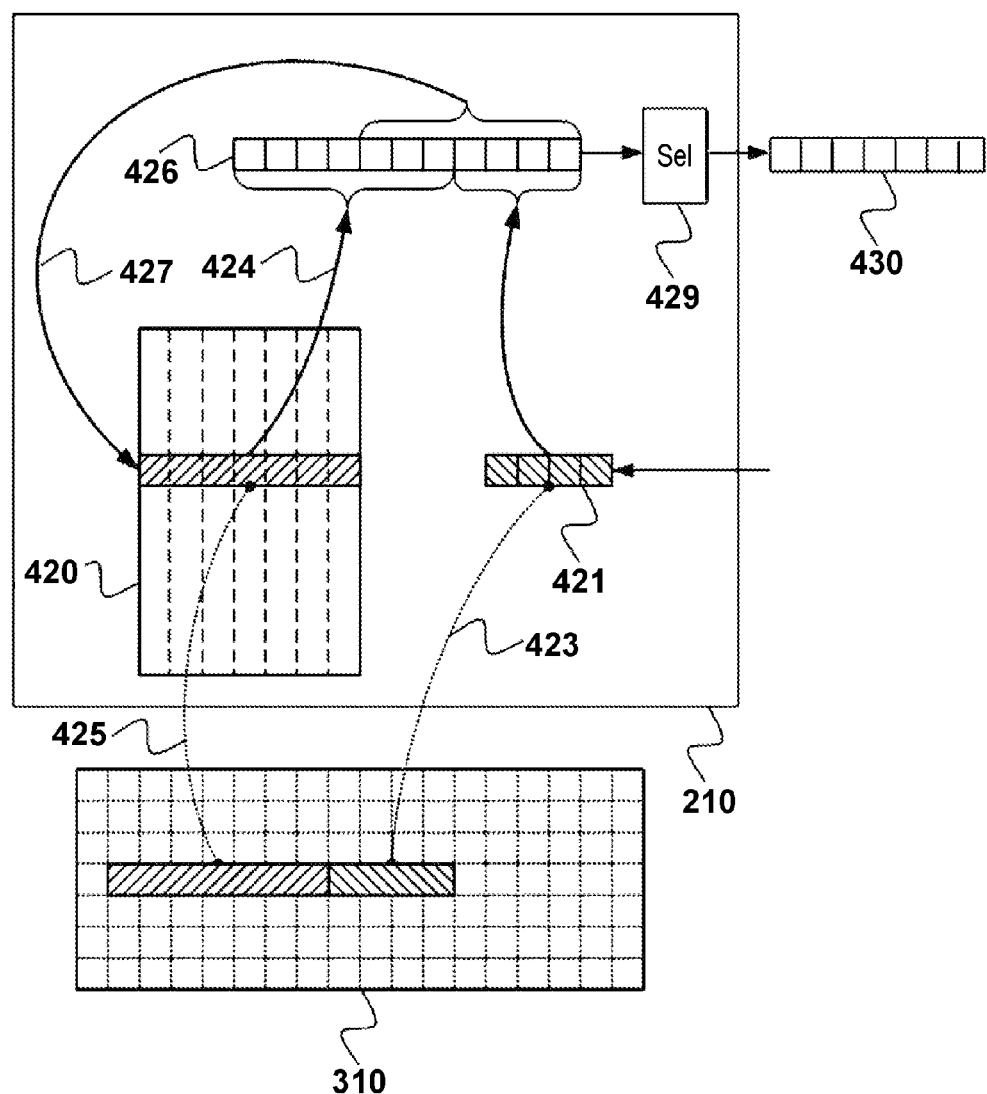

IMAGE PROCESSING APPARATUS, CONTROL METHOD OF THE SAME, AND PROGRAM

BACKGROUND OF THE INVENTION

1. Field of the Invention

The present invention relates to an image processing apparatus that executes image processing involving resolution conversion, and a control method of the image processing apparatus.

2. Description of the Related Art

Conventionally, when forming and outputting an image, the following processing has been performed. Specifically, in this processing, as in spatial filtering, computation is performed using pixels in a neighborhood area of a pixel to be processed (hereinafter simply referred to as a "processing object pixel") including the processing object pixel. Examples of the processing in which neighboring pixels are used include processing in which spatial filtering such as an edge emphasis process or blur processing is applied.

Japanese Patent No. 3733826 and Japanese Patent Laid-Open No. 2009-037348 disclose techniques in which digital image data is divided into rectangular regions (bands) and the processing in which neighboring pixels are used is performed in each of the rectangular regions.

Here, in contrast to a (main-scanning direction, sub-scanning direction) coordinate system of image data shown in FIG. 1A, as shown FIG. 1E, a (length direction, height direction) coordinate system is defined as a band area coordinate system, and the band size is represented by length×height. It should be noted that it is assumed that the sub-scanning direction crosses the main-scanning direction at right angles. Since an image is divided into strip-like bands, the length of the bands is either the length of the image data in the main-scanning direction or the length of the image data in the sub-scanning direction. On the other hand, the height of the bands can be an arbitrary value.

According to Japanese Patent No. 3733826, first, pixels in a first band are sequentially scanned one by one in the height direction of the band area, beginning from an upstream end in the main-scanning direction. This scanning operation is repeated in the main-scanning direction on a column-by-column basis to scan the whole band. When scanning of the band has been completed, scanning is repeated in the same manner in subsequent bands in the sub-scanning direction to scan the image data. In order to apply spatial filtering simultaneously with this scanning process, it is necessary to provide a delay memory in an upstream stage of a computation unit. When a reference area of a spatial filter with respect to one processing object pixel is set to [Fw×Fh], the capacity of the delay memory is an amount of (Fw−1) columns in a band. Here, it is assumed that an area [A×B] refers to a rectangular region having A pixels as its horizontal width (the length direction) and B pixels as its vertical width (the height direction). The delay memory used herein sequentially provides pixels in the [Fw×Fh] area to be referred to by the computation unit. In this case, one pixel is output each time one pixel is input (except in an end portion of the band), and the order in which pixels are output is the same as the scanning sequence (the order of input). Moreover, the capacity of the delay memory depends on the reference area of the filter and the band height.

According to Japanese Patent Laid-Open No. 2009-037348, first, a unit of scan consisting of two or more pixels that are contiguous in the length direction of a band area (hereinafter, a minimum scan width continuous in the length direction of a band area will be simply referred to as a unit of scan) is set. Pixels in the unit of scan are sequentially scanned one by one in the main-scanning direction. This scanning operation is repeated in the sub-scanning direction for as many times as the number of pixels of the height of the band, and furthermore, scanning is repeated downstream in the main-scanning direction in the same manner, thereby scanning a whole band. Then, subsequent bands in the sub-scanning direction are scanned to scan a whole set of image data. Thus, the number of times the delay memory is accessed per pixel is reduced. In order to apply common spatial filtering with this technique, it is necessary that a delay memory that is capable of storing (Fw−1) columns in a band be provided in an upstream stage of the computation unit, as is the case with Japanese Patent No. 3733826. This delay memory provides a [Fw×Fh] pixel area to the filter computation unit to output one pixel. At this time, one pixel is output each time one pixel is input (except in the end portion of the band), and the scanning sequence for output is the same as the scanning sequence for input.

In the following description, the number of pixels per unit of scan is set to Zw pixels in the length direction of the band. In this case, areas into which a single band is divided every Zw pixel columns are referred to as band columns. It should be noted that, when Zw=1, the scanning sequence is the same as that of Japanese Patent No. 3733826, and hereinbelow, the scanning method disclosed in Japanese Patent No. 3733826 and the scanning method disclosed in Japanese Patent Laid-Open No. 2009-037348 will be treated collectively assuming Zw is an integer of 1 or more.

Here, a resolution conversion method will be briefly described. A commonly known resolution conversion method is a method that uses interpolation computation. With this method, as in spatial filtering, pixel values of reference pixels located within an original image in the neighborhood of a processing object pixel are used. Enlargement processing (conversion to a higher resolution) that uses interpolation computation will be described using FIG. 2. In this diagram, solid lines 131 indicate boundaries of pixels of an image prior to enlargement, and broken lines 132 indicate boundaries of pixels of the image after enlargement. Moreover, an area 130 indicates a pixel to be processed. Each of zones "a", "b", "c", "d", and "e" indicates a single row in the original image, and each of zones "f", "g", "h", "i", and "j" indicates a single column in the original image.

For example, a bilinear interpolation method uses [2×2] reference pixels located in the neighborhood of the processing object pixel. That is to say, in order to calculate the pixel value of a processing object pixel 130-1, pixel values within a [2×2] area defined by the rows "b" and "c" and the columns "h" and "i" are referred to. On the other hand, in order to calculate the pixel value of a processing object pixel 130-2, the pixel values within the same [2×2] area defined by the rows "b" and "c" and the columns "h" and "i" as that in the case of the pixel 130-1 are referred to as well.

Moreover, in the case of a common bicubic interpolation method, in order to calculate the pixel values of the pixel 130-1 and the pixel 130-2, pixel values within a [4×4] area defined by the rows "a"-"d" and the columns "g"-"j" are referred to. As described above, in enlargement processing, there are cases where the same pixel area is referred to in order to perform computation of different processing object pixels.

Hereinbelow, an enlargement ratio and a reduction ratio in resolution conversion processing will be treated as scales. Here, a scale is a ratio in length. A scale of more than 1 indicates enlargement (an increase in resolution), and a scale of less than 1 indicates reduction (a decrease in resolution).

For example, in the case of enlargement processing in which both of the scales in the length direction and the height direction are 2 (hereinafter simply referred to as resolution conversion processing with the scales of 2), [2×2] processing object pixels are calculated from the same reference area except in an end portion of the image.

When the aforementioned scanning method is applied to resolution conversion processing with the scales of 2 as described above, [2Zw×2] outputs are obtained for each input of Zw pixels. That is to say, if output pixels are output as they are in accordance with the order of input pixels, the number of pixels per unit of scan for output (the number of pixels to be successively output and arranged in the main-scanning direction) is twice the number of pixels per unit of scan for input. Similarly, in the case of reduction processing with the scales of ½, the number of pixels per unit of output scan is ½ times (when the number of pixels per unit of input scan is an even number). In this manner, the number of pixels per unit of output scan differs depending on the scales, and therefore even if the configuration disclosed in Japanese Patent No. 3733826 or Japanese Patent Laid-Open No. 2009-037348 is adopted, it is necessary to take the scales into consideration in constructing circuitry of a module in a downstream stage that handles pixel data after resolution conversion, and this has led to an increase in circuit size (because it is necessary to take the large values of the scales into consideration in providing a delay memory).

SUMMARY OF THE INVENTION

The present invention provides an image processing apparatus in which even if there is a change in the number of pixels before and after processing as in resolution conversion, the size of a memory in a downstream stage is not influenced.

According to one aspect of the present invention, an image processing apparatus that converts first image data having a first resolution to second image data having a second resolution that is different from the first resolution comprises an input unit adapted to sequentially scan the first image data, in units of a predetermined number of pixels that are contiguous in a first direction of the first image data, in a second direction crossing the first direction at right angles, thereby inputting a pixel group corresponding to each unit of pixels; a computation unit adapted to calculate pixel values of the second image data corresponding to the second resolution using pixel values of pixels in a reference area that is an area having a predetermined range in the first image data; a storage unit adapted to store pixel values of a range of the first image data that is larger than the reference area in the first direction, and store the pixel group input by the input unit; and a control unit adapted to control the computation unit so as to successively output pixels of the second resolution in the first direction in units of the predetermined number of pixels using the pixels stored in the storage unit.

According to another aspect of the present invention, an image processing apparatus that converts first image data having a first resolution to second image data having a second resolution that is different from the first resolution comprises an input unit adapted to sequentially scan the first image data, in units of a first predetermined number of pixels that are contiguous in a first direction of the first image data, in a second direction crossing the first direction at right angles, thereby inputting a pixel group corresponding to each unit of pixels; a computation unit adapted to calculate a second predetermined number of pixel values of the second image data corresponding to the first predetermined number of pixel values of the first image data using pixel values of pixels in a reference area that is an area in the first image data, the area having a width of the first predetermined number in the first direction; and an output unit adapted to store the pixel values of the second image data output by the computation unit, and sequentially output the pixel values of the second image data in the second direction in units of output of the first predetermined number of pixels in the first direction.

According to still another aspect of the present invention, a control method of an image processing apparatus that converts first image data having a first resolution to second image data having a second resolution that is different from the first resolution comprises sequentially scanning the first image data, in units of a predetermined number of pixels that are contiguous in a first direction of the first image data, in a second direction crossing the first direction at right angles, thereby inputting a pixel group; performing computation in which a computation unit calculates pixel values of the second image data corresponding to the second resolution using pixel values of pixels in a reference area that is an area having a predetermined range in the first image data; causing a storage unit to store pixel values of a range of the first image data that is larger than the reference area in the first direction, and store the pixel group input in the inputting step; and controlling the computation unit so as to successively output pixels of the second resolution in the first direction in units of the predetermined number of pixels using the pixels stored in the storage unit in the computation step.

According to yet another aspect of the present invention, a control method of an image processing apparatus that converts first image data having a first resolution to second image data having a second resolution that is different from the first resolution comprises sequentially scanning the first image data, in units of a first predetermined number of pixels that are contiguous in a first direction of the first image data, in a second direction crossing the first direction at right angles, thereby inputting a pixel group corresponding to each unit of pixels; performing computation in which a computation unit calculates a second predetermined number of pixel values of the second image data corresponding to the first predetermined number of pixel values of the first image data using pixel values of pixels in a reference area that is an area having a predetermined range in the first image data, the predetermined range having a width in the first direction defined by the first predetermined number; and storing the pixel values of the second image data calculated in the computation step and sequentially outputting the pixel values of the second image data in the second direction in units of output of the first predetermined number of pixels in the first direction.

Further features of the present invention will become apparent from the following description of exemplary embodiments with reference to the attached drawings.

BRIEF DESCRIPTION OF THE DRAWINGS

FIGS. 1A, 1B, 1C, 1D, and 1E are diagrams showing a method for scanning pixels of common image processing.

FIG. 2 is a diagram showing a positional relationship of pixels in interpolation computation.

FIG. 3 is a diagram showing a schematic configuration of an image processing apparatus according to Embodiment 1.

FIGS. 4A, 4B, and 4C are diagrams showing a method for scanning pixels.

FIG. 6 is a diagram showing an operational concept of a column delay unit.

DESCRIPTION OF THE EMBODIMENTS

First Embodiment

Figure 1E:
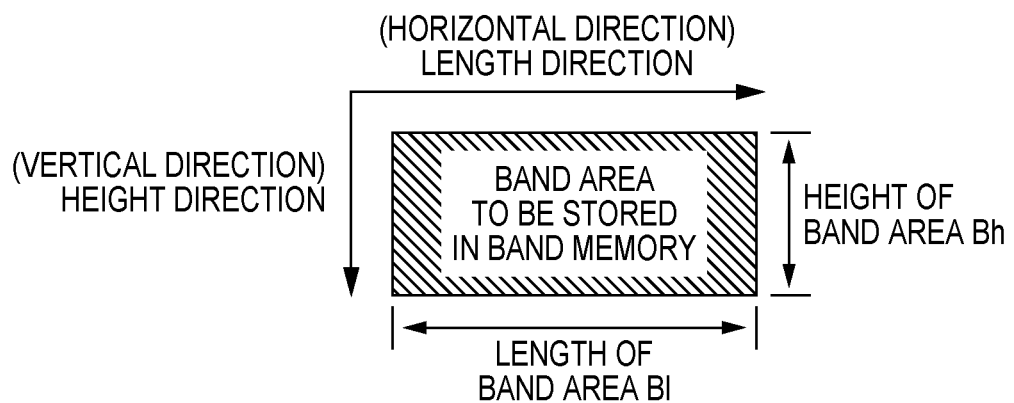

FIG. 3 shows a schematic configuration of an enlargement processing module for increasing the resolution by interpolation computation according to Embodiment 1 of the present invention. As shown in FIG. 3, an image processing apparatus 100 includes a FIFO (First In First Out) 200, a column delay unit 210, which is a storage unit, a block register 220, an interpolation computation unit 230, and a control unit 240. That is to say, first image data input to the FIFO 200 is subjected to resolution conversion by the image processing apparatus 100 and output from the interpolation computation unit 230 as second image data. An enable signal 261 controls the operation of the FIFO 200. The control unit 240 outputs an address 262a of an SRAM (not shown) included in the column delay unit 210, an output select signal 262b, and a write enable signal 262c to the column delay unit 210. Moreover, the control unit 240 outputs a shift signal 263a and an output block select signal 263b to the block register 220, and outputs an interpolation parameter 264 to the interpolation computation unit 230.

In the present embodiment, the number of pixels to be referred to by the interpolation computation unit 230 is set to [4×4]. In the case of a spatial filter, which does not perform resolution conversion, the column delay unit 210 requires a capacity to store three columns of pixels of a partial area (a band), while in the present embodiment, since resolution conversion is performed, a capacity to store seven columns of pixels of the band is provided. By increasing the memory capacity of the column delay unit 210 in this manner, processing is performed so that a [4×4] reference area can be provided to the interpolation computation unit 230, so that the predetermined number of pixels per unit of input scan and the predetermined number of pixels per unit of output scan are the same as each other. This will be described below.

First, it is assumed that the input and output scanning sequences are as shown in FIG. 4A. In each of FIGS. 1A to 1D, a first pixel group is input by sequentially scanning units of scan each consisting of a predetermined number of pixels, that are contiguous in a first direction, in a second direction. Here, the first direction is the main-scanning direction and the second direction is the sub-scanning direction crossing the first direction at right angles. Here, the output scanning sequence refers to the order in which output pixels are arranged in a two-dimensional plane. FIG. 4A shows input band columns 320 of a band area 310 extracted from a plurality of band areas into which digital image data has been divided. Moreover, FIG. 4B shows the image processing apparatus 100, which processes pixels in a band area that has been input. Furthermore, FIG. 4C shows output band columns 340 in an output band area 330, which have been output from the image processing apparatus 100. With respect to a first pixel group, when a unit of input scan consists of Iw pixels, and a unit of output scan of the image processing apparatus 100 consists of Ow pixels, processing is performed in such a manner that the predetermined number of pixels per unit of output scan is equal to the number of pixels per unit of input scan as shown in FIGS. 4A to 4C, that is, such that if Iw=4, Ow=4.

Figure 5:
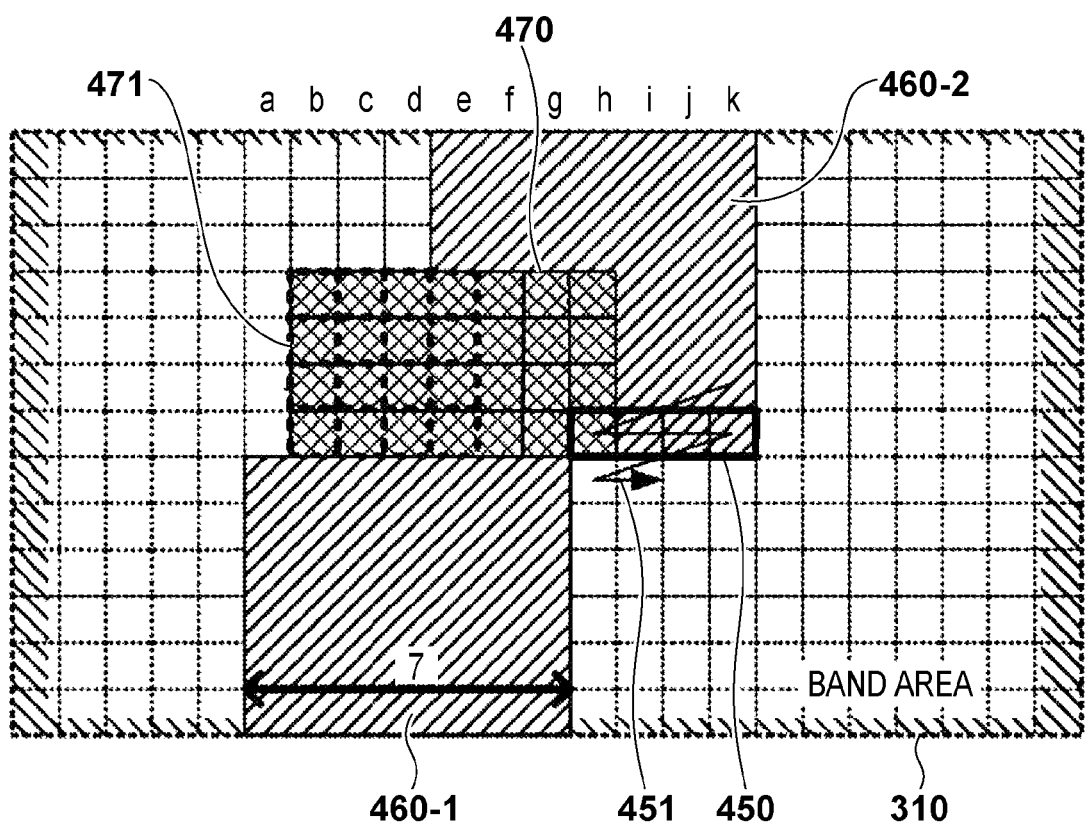
FIG. 5 is a diagram showing an image processing method in the case where resolution conversion is involved.

FIG. 5 is a diagram illustrating an image processing method of the present embodiment. In this diagram, the area 310 enclosed by oblique lines indicates a band area. Moreover, a reference pixel area 471, which is an area to be referred to in order to process a processing object pixel, is a [4×4] area, and pixel values of this reference pixel area 471 are sent to the interpolation computation unit 230. In FIG. 5, a unit of input scan 450 indicates that four pixels are scanned in a single scan. As a result of this scan, pixel values of the four pixels are input to the column delay unit 210. An input scanning sequence 451 indicates the order in which input pixels are scanned. Pixel areas 460 indicate pixel areas stored in the column delay unit 210. Moreover, a pixel area 470 indicates a [7×4] pixel area stored in the block register 220. Furthermore, columns "a", "b", ..., and "k" identify respective columns in the band.

In order to set the unit of output scan Ow of the interpolation computation unit 230 to 4, input to the interpolation computation unit is performed while shifting the columns of the reference area 471 in such a manner that the reference area 471 is appropriate for the processing object pixel. Here, it is assumed that the reference pixel area 471 corresponding to a single unit of output scan is the columns "b"-"e", the columns "c"-"f", the columns "d"-"g", and the columns "e"-"h". In this case, when the columns "e"-"h" are referred to, the column "h" is not contained in a pixel area 460-1 in the column delay unit, and therefore an input area "h"-"k" of the unit of scan 450 is received.

There is a possibility that in addition to the processing object pixel with respect to which the reference area is the columns "e"-"h", the same columns "e"-"h" may also be referred to with respect to a processing object pixel located immediately to the right of the former processing object pixel. Since this pixel immediately to the right belongs to the next output band column, the columns "e"-"h" are stored in a pixel area 460-2 in the column delay unit 210. Moreover, since the columns "i"-"k" among the scanned pixels are to be referred to when outputting the next band column, these columns are stored in the pixel area 460-2 in the column delay unit 210. Therefore, the columns "e"-"k" are stored in the pixel area 460-2 in the column delay unit 210 for use in output of the next band column.

By performing control as described above, in which pixel values are stored in the column delay unit 210, it is possible to provide a reference pixel area in such a manner that the unit of output scan of the interpolation computation unit 230 is 4 pixels. That is to say, in order to set the number of pixels per unit of output scan to 4 even if there is a change in scale, the column delay unit 210 requires a sufficient capacity to store seven pixel columns of a band.

Next, the operation of the sub-modules, that is, the FIFO 200, the column delay unit 210, the block register 220, the interpolation computation unit 230, and the control unit 240 will be described.

Pixel data input from outside of the module is first input to the FIFO 200, where timing adjustment is performed. When the enable signal 261 received from the control unit 240 is enabled, if pixel values of a single unit of scan (pixel values of four pixels that are contiguous in the main-scanning direction) are present in the FIFO 200, the pixel values of this unit of scan are sent to the column delay unit 210. FIG. 6 shows a memory area and its position of the column delay unit 210.

The band area 310, an SRAM 420, input pixels 421, a position 423 of the input pixels in the band, and a readout route 424 from the SRAM 420, which is used as a buffer, are shown in FIG. 6. Moreover, a position 425 of pixels that have been read out in the band, a combined pixel group 426, a writing route 427 to the SRAM 420, a selector 429, and output pixels 430 are shown in FIG. 6. A single word in the SRAM 420 consists of seven pixels, and pixel data of seven pixels that are contiguous in the length direction (a horizontal direction) of the band is read out from and written to the SRAM. The number of words corresponds to the number of pixels of the height of the input band 310.

The address 262a is obtained in the control unit 240 as a coordinate in the height direction (a vertical direction) of the pixel data. Then, once the address 262a has been sent to the column delay unit 210, the column delay unit 210 combines the pixel data (421 in FIG. 6) of the four pixels of a single unit of scan, which has been received from the FIFO 200, and the pixel data (424 in FIG. 6) of the seven pixels corresponding to a single word read out from the SRAM, and stores the eleven pixels (426 in FIG. 6) that are contiguous in the length direction of the band. Then, the column delay unit 210 sequentially sends seven pixels selected based on the output select signal 262b or the pixel data of the seven pixels corresponding to the single word read out from the SRAM to the block register 220 (430 in FIG. 6).

In FIG. 5, seven pixels in the columns "b"-"h" are sent to the block register 220. Which pixel data is output to the block register 220 is determined based on the output select signal 262b received from the control unit 240. Moreover, in the case where pixel data has been received from the FIFO 200 (in the case where the write enable signal 262 is enabled), the received four pixels and three pixels that have been read out from the SRAM of the column delay unit 210 and that are contiguous with the received four pixels in the length direction are combined and written to the SRAM. In the example shown in FIG. 5, seven pixels in the columns "e"-"k" are written to the SRAM.

The block register 220 receives pixel data of the seven pixels that are contiguous in the length direction of the band from the column delay unit 210, and temporarily stores four rows of pixel data in the height direction of the band, that is, pixel data of up to [7×4] pixels. When the shift signal 263a from the control unit 240 is enabled, the block register 220 sequentially shifts the pixel data by a single row. Based on the output block select signal 263b received from the control unit 240, [4×4] pixels selected from the [7×4] stored pixels are selected, and the selected pixels are sent to the interpolation computation unit 230.

In the interpolation computation unit 230, interpolation computation is applied to the pixel data of the [4×4] pixels received from the block register 220 to output pixel data of a single pixel. It should be noted that, the interpolation computation unit 230 may refer to the same [4×4] pixels to output pixel data of another pixel. The interpolation computation unit 230 receives the parameter 264 serving as a coefficient of interpolation computation from the control unit 240.

The control unit 240 exchanges image data with an external apparatus (not shown) by handshake communication. The control unit 240 includes a management unit (not shown) that manages coordinate information of an input pixel and coordinate information of a processing object pixel. The management unit obtains the coordinate information by counting the number of input pixels and the number of output pixels. The control unit 240 has a function of generating, based on the coordinate information, the enable signal 261 as a control signal to the FIFO 200, and the address 262a, the output select signal 262b, and the write enable signal 262c to the column delay unit 210. Moreover, the control unit 240 has a function of generating the shift signal 263a and the output block select signal 263b to the block register 220, and the parameter 264 to the interpolation computation unit 230.

Next, a method for generating the signals of the control unit 240 will be described. Now, it is assumed that Ox is an X coordinate and Oy is a Y coordinate of pixel data in an output image, and Ix is an X coordinate and Iy is a Y coordinate of pixel data in an input image associated with the pixel data in the output image. Moreover, it is assumed that the coordinates of a position on the coordinate system of the input image to which the coordinates (Ox, Oy) in the output image are mapped are (Cx, Cy)=(f(Ox), g(Oy)). Moreover, it is assumed that when the scales are S, f(x)=x/S and g(y)=y/S, for example. Furthermore, it is assumed that integer parts of f(x) and g(y) are F(x) and G(y), respectively. That is to say, the coordinates of input pixels to be referred to in order to calculate a processing object pixel whose coordinates are (Ox, Oy) in the output image represent sixteen points that satisfy F(Ox)−1≤Ix≤F(Ox)+2 and G(Oy)−1≤Iy≤G(Oy)+2.

Figure 7:
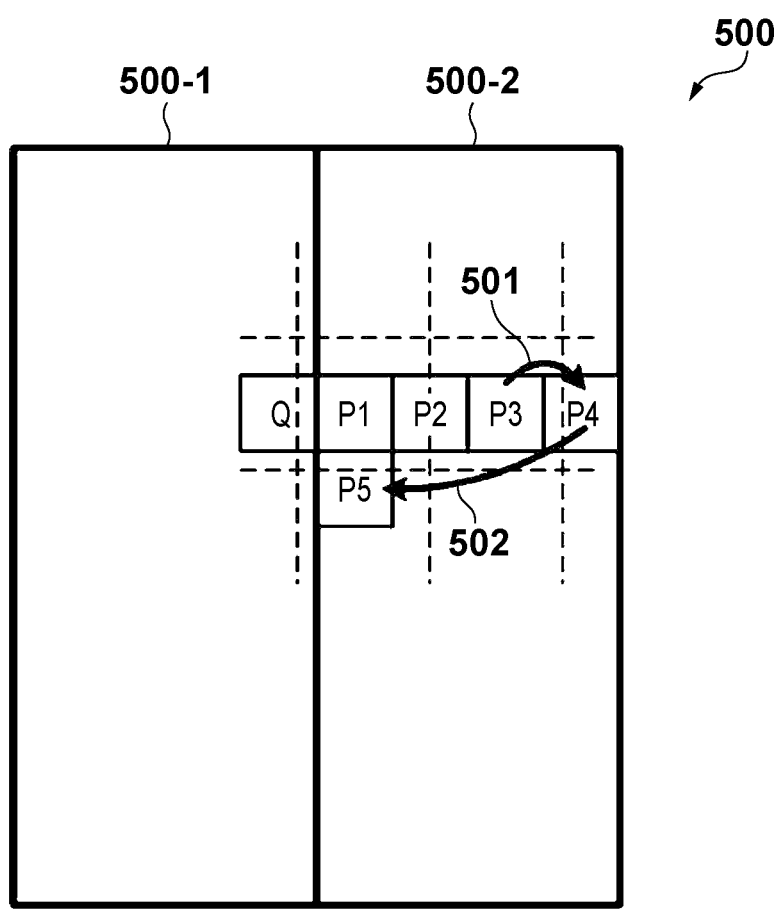
FIG. 7 is a diagram showing an operational concept of a control unit.

Here, control for outputting pixel data as a band column will be described using FIG. 7. In this diagram, two band columns 500-1 and 500-2 included in an overall band column 500 are band columns in the output image. The dashed lines indicate boundaries of pixels in the input image. It is assumed that a pixel P1 satisfies (Ox, Oy)=(4M, N), where M and N are integers of 0 or more.

Now, since the number Ow of pixels per unit of scan when outputting is 4, P1 is located in the leftmost column of the output band column. The coordinates of pixels to be processed after P1 are (4M+1, N), (4M+2, N), and (4M+3, N), and then processing proceeds to the next row to (4M, N+1) and so on. P2, P3, P4, P5, and so on respectively correspond to these coordinates.

Here, a column advance signal, a row advance signal, and a band column advance signal, which are signals of one bit, are defined. During successive output of pixels of a unit of output scan in the main-scanning direction, if the number of pixels per unit of output scan is not reached when outputting a certain processing object pixel and F(Ox)+1=F(Ox+1) holds (e.g., 501 in FIG. 7), it is necessary to shift the reference pixel area in the X direction by one column. Thus, if these conditions hold, the column advance signal is enabled, and if not, the column advance signal is disabled.

If the number of pixels per unit of output scan is reached when outputting a certain processing object pixel and G(Oy)+1=G(Oy+1) holds (e.g., 502 in FIG. 7), it is necessary to shift the reference pixel area in the Y direction by one row. At this time, the row advance signal is enabled, otherwise the row advance signal is disabled.

Next, a pixel Q that is located to the left of P1 and belongs to the output band column 500-1 and that has coordinates (4M−1, N) will be considered. If Int(F(4M−1)/4+0.5)+1=Int (F(4M+3)/4+0.5) (the function Int(x) is a value that returns an integer part of x) holds, this means that an input band column that is necessary for processing of Q differs from an input band column that is necessary for processing of P3. In other words, there are not all the reference pixels necessary for the band column 500-2 in the SRAM, and therefore it is necessary to receive the next input band column. At this time, the band column advance signal is enabled. On the other hand, if it is not necessary to receive the next input band column, the band column advance signal is disabled. The band column advance signal takes the same value in a single band column. Moreover, at this time, the enable signal 261 to the FIFO 200 and the write enable signal 262c to the column delay unit 210 are enabled when the band column advance signal is enabled and the row advance signal is enabled.

The output select signal 262b to the column delay unit 210 performs control in such a manner that four columns to be referred to when processing the rightmost pixel (e.g., P4) of a unit of output scan and three columns located to the left of the four columns are selected. That is to say, pixels whose X coordinates satisfy F(4M+3)−4≤Ix≤F(4M+3)+2 are selected.

The address 262a when reading out from and when writing to the column delay unit 210 is G(N)+2. The shift signal 263a to the block register 220 is enabled when the row advance signal is enabled. The output block select signal 263b to the block register 220, first, when processing P1, selects first to fourth columns from the left if F(4M+3)=F(4M)+3. Moreover, this signal selects second to fifth columns from the left if F(4M+3)=F(4M)+2. Furthermore, this signal selects third to sixth columns from the left if F(4M+3)=F(4M)+1 and fourth to seventh columns from the left if F(4M+3)=F(4M).

When processing P2 to P4, if the column advance signal is enabled, the block to be selected is shifted to the right by one column. If the column advance signal is disabled, the same block as that of a previously processed pixel (an adjacent pixel on the left in the unit of scan) is selected. The parameter 264 sent to the interpolation computation unit 230 is obtained by first obtaining phase differences f(Ox)−F(Ox) and g(Oy)−G(Oy) between the coordinates of the input pixel and the coordinates of the processing object pixel and then referring to a conversion table.

Figure 8:
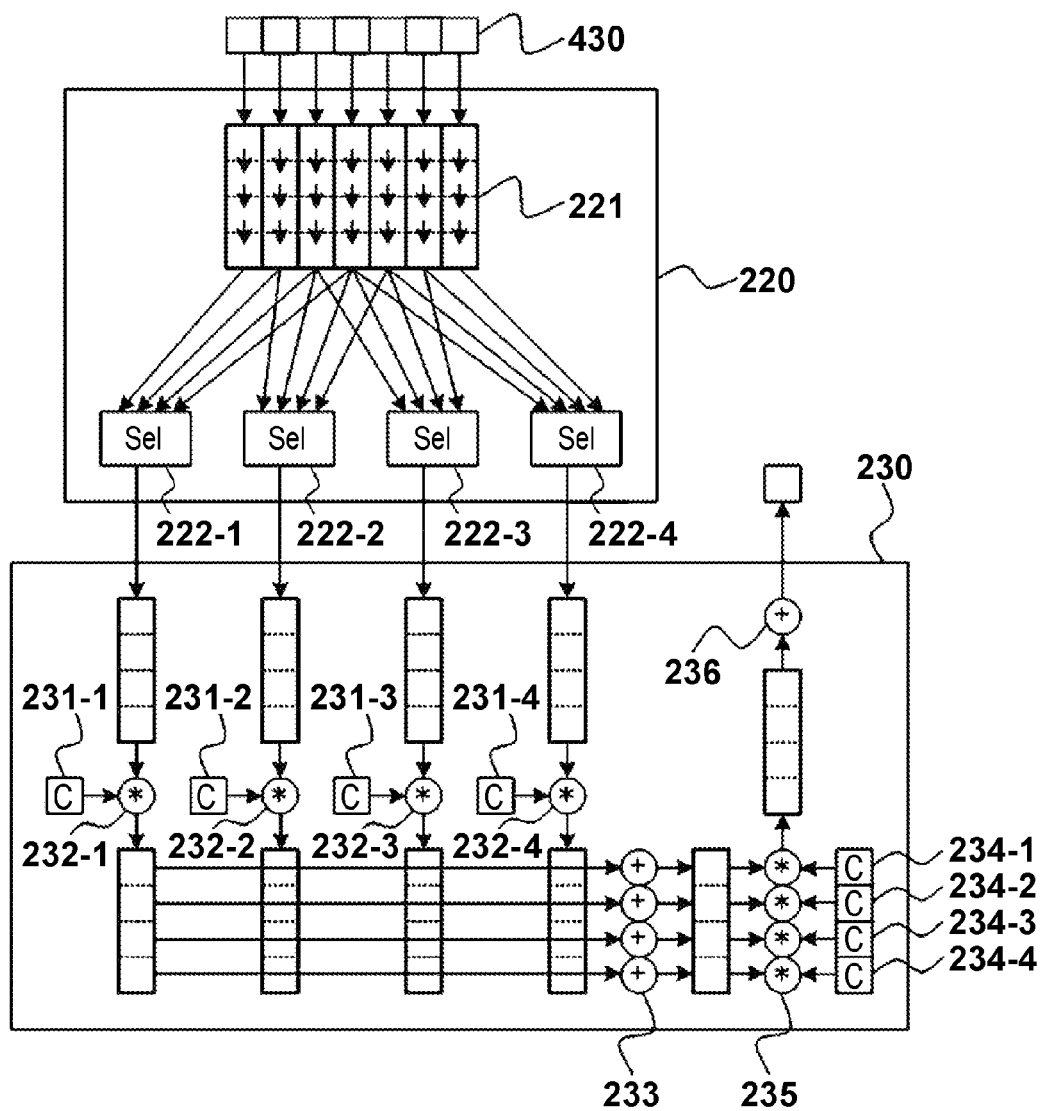
FIG. 8 is a diagram showing the operation of a block register and an interpolation computation unit.

FIG. 8 shows the configuration of the block register 220 and the interpolation computation unit 230. A pixel group 430 consisting of seven pixels is received from the column delay unit 210, and in the block register 220, a register 221 stores the seven pixels. The block register also includes selectors 222 that select pixels stored in the register. The interpolation computation unit 230 includes parameters 231, multipliers 232, adders 233, parameters 234, multipliers 235, and an adder 236.

When the block register 220 has received the shift signal 263a from the control unit, the block register shifts the pixel data stored in the register 221 as shown in FIG. 8. With regard to the pixel data in the register 221, a [4×4] pixel group is selected from the [7×4] pixel group by the selectors 222 and sent to the interpolation computation unit 230. As has been described with reference to FIG. 7, in order to output data after resolution conversion in units of Zw pixels P1 to P4, the control unit 240 in FIG. 3 generates the output block select signal 263b to selectors 222-1 to 222-4 in FIG. 8.

The pixel data input to the interpolation computation unit 230 is multiplied by the parameters 231 in the respective multipliers 232. The parameters 231 are obtained in the control unit 240 from the phase difference f(Ox)−F(Ox) in the X direction. The results of multiplication are added in the adders 233 for each row. The results of addition are multiplied by the parameters 234 in the respective multipliers 235. The parameters 234 are obtained in the control unit 240 from the phase difference g(Oy)−G(Oy) in the Y direction. All the results of multiplication are added in the adder 236. Consequently, the result of interpolation is calculated and output from the interpolation computation unit 230 as a computation output.

In this manner, in the image processing apparatus 100, the image data having the first resolution is captured in the FIFO 200 in units of input scan, converted to the second resolution in the interpolation computation unit 230, and output in units of output scan each consisting of the same number of pixels as the unit of input scan. As described above, in the present embodiment, the capacity of the column delay unit 210 in an upstream stage of the computation unit is increased from an amount of the required number of columns for a common spatial filter so that resolution conversion can also be dealt with. Thus, the number of pixels per unit of output scan can be made equal to the number of pixels per unit of input scan. It should be noted that although the number of reference pixels (the size of a local area) in the interpolation computation unit 230 was set to [4×4] in the above-described embodiment, the present invention is not limited to this, and the present invention can be implemented with an arbitrary number of pixels [Fw×Fh] (Fw and Fh are integers of 2 or more). That is to say, it is possible to apply a local area having a size of Fw pixels in the horizontal direction times Fh pixels in the vertical direction. Moreover, although the number of pixels per unit of input scan was set to 4 in the above-described embodiment, the present invention is applicable to a scanning operation in which pixels are input in units of an arbitrary number Zw of pixels (Zw is an integer of 1 or more). At this time, the capacity of the column delay unit 210 in terms of the number of columns is (Fw+Zw−1) columns.

Figure 9:
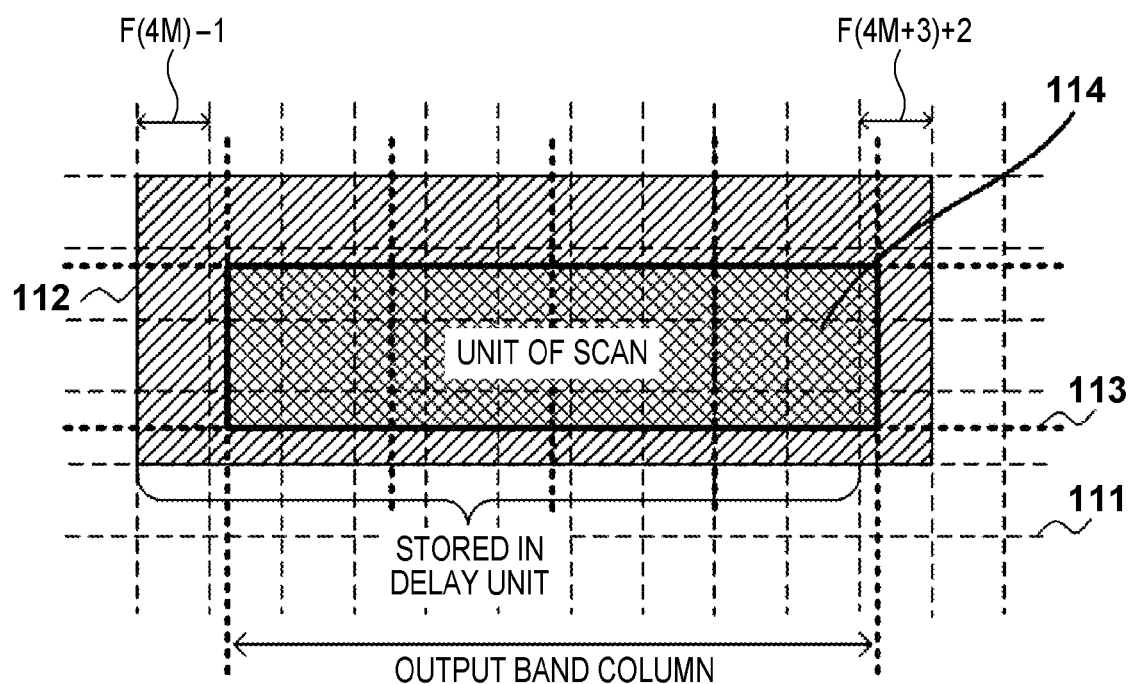
FIG. 9 is a diagram showing a positional relationship of pixels during reduction.

Moreover, although the case of enlargement (the case of increasing the resolution) has been described in the present embodiment, the present invention is applicable to reduction as well. As in the case of enlargement, it is assumed that interpolation computation is performed by referring to pixel data of a neighborhood area of [4×4] pixels. As an example, FIG. 9 shows a relationship between an input image and an output image in the case where the scale is 4/9. In this diagram, thick lines 113 indicate boundaries of pixels in the output image, thin lines 111 indicate boundaries of pixels in the input image, a unit of scan 114 indicates a single unit of scan in the output image, and a reference area 112 indicates an area in an original image that is necessary in computation of the unit of scan 114.

Assuming that the coordinates of the leftmost pixel in the unit of output scan 114 are (4M, N), the reference area 112 is an area in which the X coordinate satisfies F(4M)−1≤Ix≤F(4M+3)+2. In this case, it is necessary that the SRAM of the column delay unit 210 be capable of storing columns F(4M)−1 to F(4M+3)+1. However, in the case where reference areas with respect to all the processing object pixels do not overlap at all, since the number of columns contained in a reference area corresponding to a single unit of output scan is 16, the required capacity of the column delay unit is up to an amount of fifteen columns. That is to say, the required capacity of the column delay unit 210 is an amount of the same number of columns as the smaller value of the maximum value of F(4M+3)−F(4M)+3 (M=0, 1, 2, . . . ) and 15. In general, when Fw is an even number, the required capacity is an amount of the number of columns given by an expression (1), and when Fw is an odd number, the required capacity is an amount of the number of columns given by an expression (2). Here, F'(x) is an integer part of (f(x)+0.5).

$$\text{Min}\left\{\underset{M=0,1,...}{\text{Max}} \{F(Zw\times(M+1)-1)-F(Zw\times M)+Fw-1\},\right. \quad (1)$$
$$\left. Zw\times Fw-1\right\}$$

$$\text{Min}\left\{\underset{M=0,1,...}{\text{Max}} \{F'(Zw\times(M+1)-1)-F'(Zw\times M)+Fw-1\},\right. \quad (2)$$
$$\left. Zw\times Fw-1\right\}$$

Moreover, it is possible to deal with both enlargement and reduction by comparing the capacity of the column delay unit 210 required for enlargement described above and the capacity of the column delay unit 210 required for reduction and providing the column delay unit with a capacity corresponding to an amount of the same number of columns as the larger value.

Second Embodiment

Figure 10:
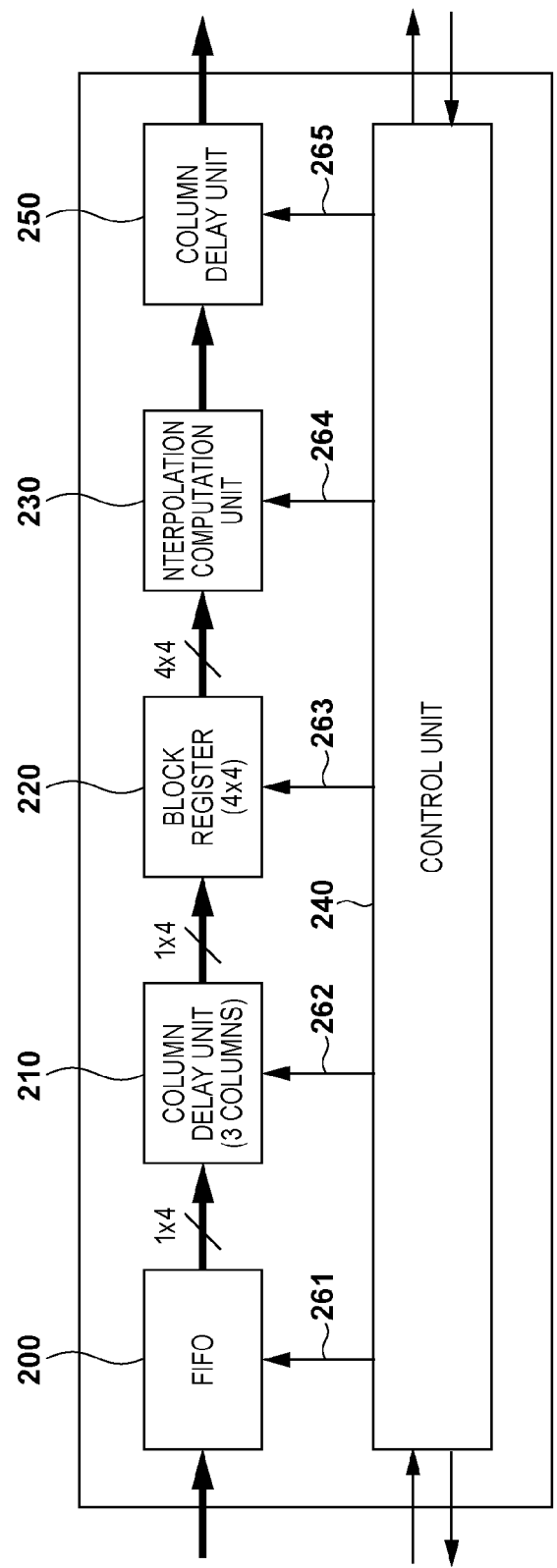
FIG. 10 is a diagram showing a schematic configuration of an image processing apparatus according to Embodiment 2.

In Embodiment 1, the capacity of the column delay unit in the upstream stage of interpolation computation was increased as compared to that in the case of a common spatial filter, and no column delay unit was disposed in a downstream stage. In Embodiment 2, the capacity of the column delay unit in the upstream stage is set to an amount of (Fw−1) columns suited to the column width, Fw, of a spatial filter, as disclosed in Japanese Patent Laid-Open No. 2009-037348. That is to say, the capacity of the column delay unit in the upstream stage is set to an amount of (Fw−1) columns for use in processing of the spatial filter, instead of the capacity of (Fw+Zw−1) columns of Embodiment 1. In Embodiment 2, after resolution conversion is performed in the interpolation computation unit, pixels are output from the interpolation computation unit in units different from the unit of input scan of the FIFO 200. In order to make this unit of output scan equal to the unit of input scan, a second column delay unit is additionally disposed in a downstream stage. FIG. 10 shows an example of the configuration of a resolution conversion module according to the present embodiment. Since the FIFO 200, the block register 220, the interpolation computation unit 230, and the control unit 240 have already been described with reference to FIG. 3 of Embodiment 1, descriptions thereof are omitted here. As shown in FIG. 10, in addition to the column delay unit 210 serving as a first storage unit of Embodiment 1, a column delay unit 250 serving as a second storage unit is newly added.

Now, it is assumed that the number Iw of pixels per unit of input scan is 4, and the scale in the X direction is 1.5. In the present embodiment, the column delay unit 210 in the upstream stage is capable of storing (Fw−1) columns, namely three columns, which is the capacity for the spatial filter, instead of (Fw+Zw−1) columns, namely seven columns. Accordingly, the number Ow of pixels per unit of scan output from the interpolation computation unit 230 is 6. In the present embodiment, the number of pixels per unit of scan is converted from 6 to 4 in the second column delay unit 250 before outputting to the outside. It should be noted that Ow is not necessarily uniform over an image. For example, if the scale in the X direction is 1.4, Ow is 5 in some cases and 6 in other cases.

Figures 11A, 11B, 11C:
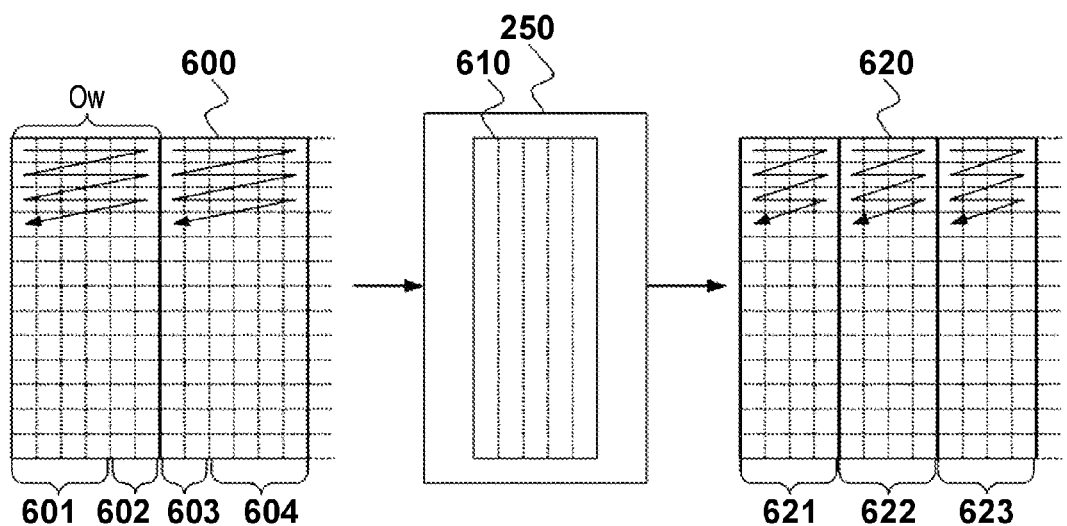
FIGS. 11A, 11B, and 11C are diagrams showing the operation of a column delay unit in a downstream stage.

The operation of the second column delay unit 250 will be described using FIGS. 11A, 11B, and 11C. An input image 600 input to the column delay unit 250 is shown in FIG. 11A. An SRAM 610 is shown in FIG. 11B, and an output image 620 output from the column delay unit 250 is shown in FIG. 11C.

Now, it is assumed that the capacity of the SRAM 610 is an amount of five columns. At this time, in a first band column in FIG. 11A, an output with respect to an input 601 is output as an output 621 in FIG. 11C, and pixel data corresponding to an input 602 is written to the SRAM 610.

In the next band column of the input image 600, the input 602 is read out from the SRAM 610, combined with an input 603, and output as an output 622 of the output image 620. A next input 604 is written to the SRAM 610. After outputting the input 602 and the input 603, the input 604 is read out from the SRAM 610 and output as an output 623 of the output image 620. By repeating the above-described scanning operation, it is possible to convert the number of pixels per unit of output scan to 4.

In general, with respect to an image in which the number of pixels per unit of scan has increased as a result of enlargement processing or the like, in the case where the number Ow of pixels per unit of scan is to be reduced to Iw using the SRAM included in the second column delay unit in the downstream stage, the required capacity of the SRAM 610 is an amount of the same number of columns as the maximum value of (Ow−1). On the other hand, with respect to an image in which the number of pixels per unit of scan has decreased as a result of reduction processing or the like, in the case where the number Ow of pixels per unit of scan is to be increased to Iw using the SRAM included in the second column delay unit in the downstream stage, the required capacity of the SRAM 610 is an amount of (Iw−1) columns.

As described above, in Embodiment 2, it has been shown that even if processing of enlargement or reduction for resolution conversion is performed, it is possible to make the number of columns of input and the number of columns of output equal to each other by providing the second column delay unit in the downstream stage of the interpolation computation unit.

Third Embodiment

In Embodiment 1, the SRAM capacity of the column delay unit 210 was set to an amount of (Fw+Zw−1) columns, while in the present embodiment, the SRAM capacity of the column delay unit 210 is set to an amount exceeding the amount of (Fw+Zw−1) columns and equal to an amount of the same number of columns as "the smallest multiple of Zw". For example, when Fw=4 and Zw=4, the column delay unit has an SRAM capacity of eight columns, which is an amount exceeding the amount of (Fw+Zw−1) columns and equal to the amount of the same number of columns as "the smallest multiple of Zw". With this configuration, it is possible for the control unit 240 to perform scanning of pixels in units of Zw pixels (Zw columns) even though the control regarding which column is to be stored in the SRAM is performed in the same manner as in Embodiment 1, and therefore there is an advantage that scanning by the control unit 240 is simplified.

As described above, scanning by the control unit 240 is simplified by setting the SRAM capacity of the column delay unit 210 to the amount exceeding the amount of (Fw+Zw−1) columns and equal to the amount of the same number of columns as "the smallest multiple of Zw", and it is possible to make the number of columns of input and the number of columns of output equal to each other even if enlargement or reduction processing of resolution conversion is performed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192700, filed on Aug. 30, 2010, which is hereby incorporated by reference herein in its entirety.

What is claimed is:

1. An image processing apparatus that converts first image data having a first resolution to second image data having a second resolution that is different from the first resolution, wherein the first resolution and the second resolution indicate a number of pixels per unit area, the apparatus comprising:
- an input unit constructed to sequentially scan the first image data, in units of a predetermined number of pixels that are contiguous in a first direction of the first image data, in a second direction crossing the first direction at right angles, thereby inputting a pixel group corresponding to each unit of pixels;
- a computation unit constructed to calculate pixel values of the second image data corresponding to the second resolution based on pixel values of pixels in a reference area-in the first image data;
- a storage unit constructed to store pixel values of the first image data, wherein a number of the pixel values is at least {Fw+Zw−1}×a number of pixels in the second direction of the first image data where Fw is a width or a height of the reference area in the first direction and Zw is the predetermined number, and store the pixel group input by the input unit; and
- a control unit constructed to control the computation unit so as to successively output pixels of the second resolution in the first direction in units of the predetermined number of pixels, by reading pixel values of same pixels, which constitute the same reference area, multiple times from said storage unit.

2. The image processing apparatus according to claim 1, wherein if the second resolution is higher than the first resolution, the storage unit stores pixels of the first image data in Fw+Zw−1 columns or Fw+Zw−1 rows and the pixel group input by the input unit.

3. The image processing apparatus according to claim 1, wherein if the second resolution is higher than the first resolution, the storage unit stores pixels of the first image data in columns or rows having a width or a height exceeding Fw+Zw−1 and equal to a smallest multiple of Zw and the pixel group input by the input unit.

4. The image processing apparatus according to claim 1, wherein if the second resolution is lower than the first resolution, the storage unit stores pixels of the first image data in columns or rows having a width or a height given by:

$$\mathrm{Min}\left\{\max_{M=0,1,\ldots}\ \{F(Zw\times(M+1)-1)-F(Zw\times M)+Fw-1\},\ Zw\times Fw-1\right\}$$

when Fw is an even number, or by:

$$\mathrm{Min}\left\{\max_{M=0,1,\ldots}\ \{F'(Zw\times(M+1)-1)-F'(Zw\times M)+Fw-1\},\ Zw\times Fw-1\right\}$$

when Fw is an odd number, and the pixel group input by the input unit, where M is a given integer, S is a scale of the resolution conversion, F(x) is an integer part of f(x)=x/S, and F'(x) is an integer part of (f(x)+0.5).

5. An image processing apparatus that converts first image data having a first resolution to second image data having a second resolution that is different from the first resolution, wherein the first resolution and the second resolution indicate a number of pixels per unit area, the apparatus comprising:
- an input unit constructed to sequentially scan the first image data, in units of a first predetermined number of pixels one of which is adjacent to another pixel of the first predetermined number of pixels in a first direction of the first image data, in a second direction crossing the first direction at right angles, thereby inputting a pixel group corresponding to each unit of pixels;
- a computation unit constructed to calculate a second predetermined number of pixel values of pixels of the second image data corresponding to the first predetermined number of pixel values of pixels of the first image data using pixel values of pixels in a reference area in the first image data, wherein the area has a width of the first predetermined number in the first direction; and
- an output unit constructed to store the pixel values of the second image data output by the computation unit in units of a second predetermined number of pixels, to convert the stored second image data to image data having scanning units of scan consisting of the first predetermined number of pixels and to sequentially output the pixel values of the image data in the second direction in units of output of the first predetermined number of pixels in the first direction,
- wherein if the second resolution is higher than the first resolution, the output unit has a storage capacity to store Ow−1 columns or Ow−1 rows of pixel values of the second image data, where Ow is the second predetermined number.

6. The image processing apparatus according to claim 5, wherein if the second resolution is lower than the first resolution, the output unit has a storage capacity to store Zw−1 columns or Zw−1 rows of pixel values of the second image data, where Zw is the first predetermined number.

7. A control method of an image processing apparatus that converts first image data having a first resolution to second image data having a second resolution that is different from the first resolution, wherein the first resolution and the second resolution indicate a number of pixels per unit area, the method comprising:
- sequentially scanning the first image data, in units of a predetermined number of pixels that are contiguous in a first direction of the first image data, in a second direction crossing the first direction at right angles, thereby inputting a pixel group;
- performing computation in which a computation unit calculates pixel values of the second image data corresponding to the second resolution using pixel values of pixels in a reference area-in the first image data;
- causing a storage unit to store pixel values of the first image data, wherein a number of the pixel values is at least {Fw+Zw−1}×a number of pixels in the second direction of the first image data where Fw is a width or a height of the reference area in the first direction and Zw is the predetermined number, and store the pixel group input in the inputting step; and
- controlling the computation unit so as to successively output pixels of the second resolution in the first direction in units of the predetermined number of pixels, by reading pixel values of same pixels, which constitute the same reference area, multiple times from said storage unit.

8. A control method of an image processing apparatus that converts first image data having a first resolution to second image data having a second resolution that is different from the first resolution, wherein the first resolution and the second resolution indicate a number of pixels per unit area, the method comprising:

sequentially scanning the first image data, in units of a first predetermined number of pixels that one of which is adjacent to another pixel of the first predetermined number of pixels in a first direction of the first image data, in a second direction crossing the first direction at right angles, thereby inputting a pixel group corresponding to each unit of pixels;

performing computation in which a computation unit calculates a second predetermined number of pixel values of pixels of the second image data corresponding to the first predetermined number of pixel values of pixels of the first image data using pixel values of pixels in a reference area in the first image data, the reference area having a width in the first direction defined by the first predetermined number; and storing the pixel values of the second image data calculated in the computation step in units of the second predetermined number of pixels, converting the stored second image data to image data having scanning units of scan consisting of the first predetermined number of pixels, and sequentially outputting the pixel values of the image data in the second direction in units of output of the first predetermined number of pixels in the first direction, wherein if the second resolution is higher than the first resolution, Ow−1 columns or Ow−1 rows of pixel values of the second image data are stored in the storing step, where Ow is the second predetermined number.

9. A non-transitory computer-readable medium storing a computer program for causing a computer to execute the steps of the control method of an image processing apparatus according to claim 7.

10. A non-transitory computer-readable medium storing a computer program for causing a computer to execute the steps of the control method of an image processing apparatus according to claim 8.

11. The image processing apparatus according to claim 1, wherein pixels scanned by the input unit and pixels that have been read out from the storage unit and are contiguous with the scanned pixels in the first direction are combined and written to the storage unit.

* * * * *